United States Patent [19]

Miller

[11] 4,009,024
[45] Feb. 22, 1977

[54] PROCESS FOR REGENERATION AND REUSE OF STEELMAKING SLAG

[75] Inventor: A. Leslie Miller, Pittsburgh, Pa.

[73] Assignee: Koppers Company, Inc., Pittsburgh, Pa.

[22] Filed: Sept. 26, 1975

[21] Appl. No.: 616,873

[52] U.S. Cl. .................................. 75/30; 75/24
[51] Int. Cl.² ............................... C21B 3/04
[58] Field of Search ............ 75/24, 30, 40, 80, 46, 75/132; 423/322, 323, 348, 349, 350

[56] References Cited

UNITED STATES PATENTS

| | | | |
|---|---|---|---|
| 282,118 | 7/1883 | Reese | 75/132 |
| 1,803,417 | 5/1931 | Walton | 423/323 |
| 2,261,516 | 11/1941 | Franchot | 423/350 |
| 2,467,039 | 4/1949 | Kerschbaum et al. | 75/24 X |
| 2,879,158 | 3/1959 | Nowacki et al. | 75/24 X |
| 3,891,428 | 6/1975 | Yordanov | 75/30 |

*Primary Examiner*—M. J. Andrews
*Attorney, Agent, or Firm*—Robert D. Yeager; Robert DeMajistre

[57] ABSTRACT

A process for the regeneration of slag involves treating the slag after the steel has been removed from the steelmaking heat. Oxygen and a fluid hydrocarbon fuel are lanced into the molten slag to reduce metal oxides in the slag to their metallic state and to purify the slag. After the treatment, the metal constituents are removed from the slag treating vessel and the molten slag can be used for another steel heat.

15 Claims, No Drawings

PROCESS FOR REGENERATION AND REUSE OF STEELMAKING SLAG

BACKGROUND OF THE INVENTION

1. Field of the Invention

This invention relates to a process for regenerating slag produced in steelmaking processes and utilizing the regenerated slag in further steelmaking operations while recovering the metal constituents produced by the regeneration. More particularly, the invention relates to cleansing molten slag of impurities and returning the purified slag to the refining furnace for utilization as a heat transfer agent and a fluxing material.

2. Description of the Prior Art

The refining of iron into steel is always accompanied by the production of a chemically complex by-product called "slag." Although steelmaking slags are sometimes used in blast furnace burden to recover the iron units present therein, such slags have been generally regarded as waste material and discarded because the cost of recovery of the constituents of the slag has been considered uneconomical.

Steelmaking slag is formed from the (i) slag-making materials purposely added to the iron charge to be refined, and (ii) impurities removed from the iron by oxidation. Steelmaking slags are classified as "acid" or "basic" according to chemistry of the process by which the iron is refined. If the iron to be refined contains such a small amount of phosphorus that need not be removed, a slag rich in silica is formed and is termed "acid." If, however, the phosphorus content of the iron is such that phosphorus removal is necessary, the chemistry requires formation of a "basic" slag. Consequently, a process in which the slag can remain acid throughout the process utilizes acid refractories in the furnace lining; whereas a process in which the slag is rendered basic requires the use of basic refractories — otherwise the refractories would be attacked by the slag and would be shortlived.

By far, the predominant process used throughout the world in making steel is the basic process. Thus, the specific descriptions of steelmaking as they relate to the present invention will be cast in terms of the basic process, while the present invention should not be restricted thereto since it is also applicable to the other steelmaking processes.

Slag-making procedures in the basic process typically call for the maintenance in the slag of a ratio of total basic components to total acid components (called the "V-ratio") of about 3:1. The oxides (e.g., $SiO_2$, $P_2O_5$, $Al_2O_3$, etc.) which form anion complexes in the melt (e.g., silicate, phosphate, aluminate, etc., anions) are said to be acidic oxides. The oxides (e.g., CaO, MgO, MnO, FeO, etc.) which break down the anion complexes in the melt are said to be basic oxides. The ratio of the concentrations of basic oxides to those of the acidic oxides is called the basicity of the slag. The common method of representing basicity is in terms of the V-ratio which, in simple slags, is the concentration ratio % CaO/% $SiO_2$. In complex slags, the amounts of MgO present are added to the basic constituents and the amounts of $P_2O_5$ to the acid constituents in computing the V-ratio.

In a typical basic steelmaking process, say the basic oxygen process, the chief impurities to be removed from the molten iron are silicon, manganese, carbon, phosphorus and sulfur. Removal of these impurities is accomplished by combining them with oxygen to form oxides. The carbon combines directly with oxygen and passes from the melt in gaseous form, either CO or $CO_2$. Silicon and manganese form liquid oxides which become part of the slag. Phosphorus and sulfur combine with the materials in the slag, capable of forming compounds with them. After the slag has been used in the steelmaking process, it is contaminated with these oxides and no longer has utility in subsequent steelmaking operations. Further a substantial amount of the metals of which the contaminating oxides are based have value in unoxidized form, and a substantial portion of iron is also in the slag which must be discarded along with the other undesirable materials.

The value of the oxidized metal contaminants has been recognized by the steelmaking industry. A method of recovery of manganese from slag was discussed in an article in Steel magazine (Nov. 26, 1951, pp. 84–85). U.S. Pat. No. 3,002,832 (1961) discloses a process for recovering metallic iron by the reduction of slag with coke breeze. U.S. Pat. Nos. 3,761,247 and 3,717,490 are also illustrative of the steel industries interest in the purification of slag.

The sensible heat of the slag is wasted since it is conventionally disposed of in molten form. Because of the rising costs of fuels, the steelmaking industry is interested in methods of conserving energy and one such measure is the recovery of the sensible heat of molten spent slag.

DESCRIPTION OF THE INVENTION

In accordance with the present invention, molten slag is treated, after removal of the steel from a heat, by lancing into the slag a fluid hydrocarbon fuel and oxygen to reduce the metal oxides in the slag.

The molten slag may be treated in the furnace in which the steel was produced or may be transferred to another suitable vessel for treatment. The temperature of the slag should be maintained at approximately the same temperature as in the production of the slags parent steel heat to provide adequate energy for the chemical reactions which will be further described herein and to conserve the sensible heat of the molten slag.

The fuels which are introduced into the slag are fluid hydrocarbon fuels preferably in the gaseous phase to provide for rapid mixing of the oxygen and fuel while contacting the molten slag. Introduction of the fuel and oxygen into the molten slag can be accomplished efficiently by means of a fuel oxygen lance which is submerged at the bottom of the treating vessel. This technique provides for mixing of the fuel and oxygen when initially contacting the molten slag.

The ratio of oxygen to fuel should be maintained to provide a reducing environment in the slag; thus, a weight ratio of oxygen to fuel (in the case of methane) should be about 2 to 1 or below. Methane in the form of natural gas has been found to be particularly advantageous in the process of the invention; however, ethane, propane, butane, fuel oil and like materials may be utilized as hydrocarbon fuels. The oxygen to be introduced with the fuel can be either high purity oxygen (99%) or commercial oxygen (95%).

After the metallic oxides in the slag have been reduced and settled by gravity in a molten pool, the molten metal constituents are removed from the slag treating vessel and are recovered. These metal constituents may be further purified or may be removed and utilized as scrap in an electric arc furnace charge.

The treated molten slag is used in a subsequent steelmaking heat with the sensible heat of the slag being recovered to provide energy for the new heat in addition to permitting a reduction in the quantity of fresh slag forming compounds.

The process of the invention will be further illustrated by the following preferred embodiment.

DESCRIPTION OF THE PREFERRED EMBODIMENT

Operating Sequence

The following description of the utilization of the present invention in steelmaking practice will be in terms of the well-known oxygen top-blown basic oxygen furnace (BOF). It will be appreciated by those skilled in the art, however, that the invention may be used in conjunction with any basic steelmaking process including open hearth, bottomblown oxygen converter, etc.

The following materials are charged to a BOF having an approximate capacity of 200 tons:

| | | |
|---|---|---|
| Steel scrap (ambient temperature) | 135,000 lbs. | (61,235 Kg) |
| Hot metal* at 2375° F | 280,000 lbs. | (127,000 Kg) |
| Burnt lime (96% CaO) | 31,000 lbs. | (14,061 Kg) |
| Fluorspar | 2,100 lbs. | (935 Kg) |

*Analysis - 4.0% C, 1.28% Si, 0.47% Mn, 0.36% P, 0.037% S 303,000 SCF (7974 Nm$^3$) of commercially pure oxygen is blown into the furnace through a three-hole lance during an interval of about 20 minutes. The furnace is turned down for steel and slag sampling, and those analyses are as follows:

| | Steel |
|---|---|
| Bath Temperature Analysis: | 2950° F (1621° C) |
| C | 0.056% |
| Mn | 0.17 |
| P | 0.017 |
| S | 0.019 |

After the furnace was turned down, the slag constituent was weighed.

| | Slag |
|---|---|
| Weight Analysis: | 58,000 lbs. (26,308 Kg) |
| CaO | 55.0% |
| SiO$_2$ | 15.0 |
| FeO | 14.7* |
| Fe$_2$O$_3$ | 6.40 |
| MnO | 2.25 |
| Al$_2$O$_3$ | 1.10 |
| MgO | 1.50 |
| P$_2$O$_5$ | 4.10 |
| S | 0.076 |

*Calculated on a total Fe basis as FeO is 20.45 percent

The heat is determined to be within acceptable chemistry and temperature ranges and is tapped; standard deoxidizing and alloying practice is observed in the ladle during tapping.

By estimating the volume of molten steel tapped into the ladle and comparing that volume with the weights of materials charged, the tapping operation is terminated prior to the appearance of molten slag in the tap stream by rotating the vessel to the upright position. The precision with which the tap is terminated to retain a heel of molten steel of specific quantity is not critical. However, optimum refining yields are achieved with the present invention by retaining a minimum weight heel of molten steel of say one ton to provide a solvent for the precipitating metal. If all of the steel is unintentionally tapped, cold scrap can be melted in the slag treating ladle soon to be described to provide the desired heel.

When the BOF vessel is brought to the upright position, it contains approximately 1 ton of liquid steel and 29 tons (26,308 Kg) of molten slag, both at a temperature of about 2900° F (1593° C). Steel and slag chemistry are essentially the same as at vehicle turndown; however, minor fluctuations may occur between slag and melt during the intervening period and thus a darkening of the top surface of the slag caused by the formation of solids may be observed. The contents of the BOF vessel are then dumped over the lip of the vessel into a slag treating vessel.

The vessel used for the practice of the present invention is preferably a refractory-lined, open-topped, steel container equipped with a tap hole or bottom slide gate nozzle for separating the liquid steel from the slag after treatment. The vessel should also have a top lip or pouring spout for conveniently returning the molten slag to the BOF vessel after completion of the process of the present invention. An example of a suitable slag treating vessel is a conventional BOF hot metal ladle fitted with a stopper rod assembly or bottom slide gate. The vessel capacity is selected to provide a volume equal to at least twice the volume occupied by the liquid slag; so in the present example, the vessel is capable of containing at least about 60 tons (54,431 Kg) of liquid slag.

After receiving the slag and steel heel from the BOf vessel, the slag treating vessel is transported to a nearby station prepared for the purpose. The station preferably includes a ladle stand positioned beneath a fume hood, and a fuel-oxygen lance with suitable supporting means for immersing the lance tip into the slag/steel bath. In the process of the present invention described further below, fuel and oxygen are simultaneously introduced into the liquid slag through the lance for a predetermined period of time. Thereafter, the lance is withdrawn and the slag treating vessel is again transported to a metal disposal station where, by manipulation of the stopper rod or slide gate mechanism, the liquid steel, comprising the initial metal heel plus the metallic elements reverted from the slag during the prior treatment thereof, is drained from the vessel. Conventional ingot molds may be used as suitable containers for the liquid steel.

Following the draining operation, the molten slag remaining in the vessel is recharged to the BOF vessel on a subsequent heat, preferably prior to the charging of steel scrap and hot metal.

Slag Treatment

For a standard 200 ton (181,436Kg) hot metal ladle, the nominal size used for making a 190 ton (172,365 Kg) heat as described above, 1 ton (907 Kg) of liquid steel provides a bath depth of less than 1 inch (0.0254 m); 29 tons (26,308 Kg) of liquid slag occupy about 6 feet (1.829 m) of vessel depth. In order to provide the gas/slag disengaging volume during the process of the invention, the vessel selected should have a total volume corresponding to a 200 ton (181,436 Kg) capacity hot metal ladle having about 14 feet (4.267 m) of active height. This freeboard is essential to safely contain the molten slag whose surface will be agitated — moderately to violently — by the upward flow and escape of gases during the process of the invention.

The slag contained in the slag treating vessel is highly oxidized and strongly basic, the V-ratio of the slag being in the range of 3. The process of the present invention involves the reaction of a fluid hydrocarbon, preferably methane, with controlled amounts of oxygen within the body of the liquid slag for the purpose of generating heat and forming reducing gases. The reducing gases then react with the oxides of iron, manganese, phosphorus and silicon which are present in the slag to release the elemental materials which gravitate to the metal heel. What remains is a lime-rich, semi-molten mass which is returned to the steelmaking furnace to recover its slag-making and heat values.

In the first moments of gas injection into the liquid slag, the free oxygen entrained in the slag reacts with the methane; the heat of combustion produced by this reaction is given in large measure to the liquid slag. Free oxygen present in the slag is rapidly depleted, however, and without an external source of oxygen, the methane gas would undergo endothermic decomposition to produce hydrogen and carbon, accompanied by a cooling of the slag. The simultaneous injection of oxygen through the lance (described above) with the methane, therefore, provides a control mechanism for apportioning the amounts of fuel gas combusted and cracked at the prevailing 2900° F (1593° c) temperature condition.

Methane will react with oxygen to release 22,000 BTU/lb. ($92 \times 10^6$ J/Kg °K) of $CH_4$ under conditions of complete combustion. When the availability of oxygen for reaction with methane is zero, however, 2000 BTU/lb. ($8.4 \times 10^6$ J/Kg °K) of $CH_4$ are utilized by the dissociation of methane to elemental carbon and hydrogen. Further, at 2900° F (1593° C) and with oxygen present in a weight ratio of 2:1 to methane, the distribution of reaction products has been determined to be:

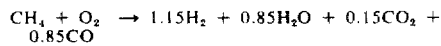

As will be pointed out below, the amount of CO and $H_2$ gas produced by this reaction is important because it serves to reduce the iron and metalloid oxides in the slag. The net heat release in the above reaction is 7984 BTU/lb. ($33.4 \times 10^6$ J/Kg ° K) of $CH_4$. When oxygen to fuel gas ratio exceeds 2:1, a greater part of the fuel gas is combusted, whereas a greater part is cracked when the ratio is less than 2:1.

It may be seen by the foregoing that the weight of fuel gas required in the process of the present invention may be computed on the basis of the amount of CO required for reduction of the oxides in the slag. Though not wishing to be bound by any particular theory, it is believed that the reduction reactions and energy transfers that occur in the process of the invention are:

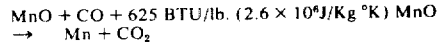

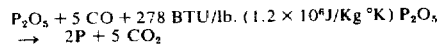

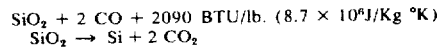

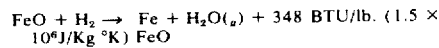

Further, it is believed that the additional heat required for separation of $P_2O_5$ and $SiO_2$ from their CaO bonds is equal to the heats of their formation, viz:

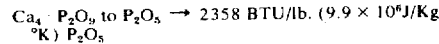

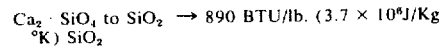

By addition, the heat for separating and reducing, $Ca_4 \cdot P_2O_9$ is 2636 BTU/lb. ($11 \times 10^6$ J/Kg °K) $P_2O_5$ and for $Ca_2 \cdot SiO_4$ is 2980 BTU/lb. ($12.5 \times 10^6$ J/Kg °K) $SiO_2$. It readily may be seen, therefore, that the amount of fuel gas required to reduce the oxides of a particular slag may be determined, simply by calculating the amounts of each oxide present.

EXAMPLE I

In the slag analysis given above, the following weights of oxides were present:

| | | |
|---|---|---|
| FeO | 11,861 lbs. | (5,380 Kg) |
| MnO | 1,305 | (592 Kg) |
| $P_2O_5$ | 2,378 | (1,079 Kg) |
| $SiO_2$ | 8,700 | (3,946 Kg) |

At full efficiency, the CO required to reduce these oxides is:

| | | |
|---|---|---|
| MnO | 514 lbs | (233 Kg) |
| $P_2O_5$ | 2,342 | (1,062 Kg) |
| $SiO_2$ | 8,130 | (3,688 Kg) | or about 11,000 lbs. (4,989 Kg) of CO. The hydrogen required for complete FeO reduction is 330 lbs. (150 Kg). Expressed on a weight basis, the primary reaction of the process of the invention is:
16 lbs. (7.26 Kg) $CH_4$ + 32 lbs. (14.52 Kg) $O_2$ →
2.3 lbs. (1.04 Kg) $H_2$ + 15.3 lbs. (6.94 Kg) $H_2O$ ×
6.6 lbs. (2.99 Kg) $CO_2$ × 23.8 lbs. (10.80 Kg) CO
+ 127,744 BTU ($135 \times 10^6$ J)

To form 11,000 lbs. (4,989 Kg) of Co, the overall material balance is:
7395 lbs. (3354 Kg) $CH_4$ + 14,790 lbs. (6709 Kg) $O_2$
→ 1063 lbs. (482 Kg) $H_2$ + 7072 lbs. (3208 Kg)
$H_2O$ + 3051 lbs. (1384 Kg) $CO_2$ + 11000 lbs.
(4989 Kg) CO + $59.0 \times 10^6$ BTU ($62 \times 10^9$ J)

The energy input compared with the energy required for separation and reduction of the oxides in the slag is as follows:

| | | | | | |
|---|---|---|---|---|---|
| MnO to Mn | 1305 lbs | ( −625 BTU/lb) | = | − 815,600 BTU | ($0.86 \times 10^9$ J) |
| $Ca_4 \cdot P_2O_9$ to P | 2376 lbs | ( −2636 BTU/lb) | = | − 6,263,100 BTU | ($6.60 \times 10^9$ J) |

| | | | | | |
|---|---|---|---|---|---|
| Ca$_2$ SiO$_4$ to Si | 8700 lbs | ( − 2980 BTU/lb) | = | − 25,926,000 BTU | (27.35 × 10$^9$ J) |
| FeO to Fe | 11861 lbs | ( + 348 BTU/lb) | = | + 4,127,600 BTU | (4.35 × 10$^9$ J) |
| | | | | Σ − 28,877,100 BTU | (30.46 × 10$^9$ J) |

The heat surplus, therefore, is 59−29 × 10$^6$ BTU = 30.0 × 10$^6$ BTU (31.6 × 10$^9$ J). Heat losses from the slag treatment vessel due to convection and radiation occur but are not significant enough to influence treatment time.

Additional heat potential is provided by the excess hydrogen liberated in the dissociation of methane. A quantity of hydrogen is used to reduce to FeO as described above, but in this example there is an excess of 733 lbs. (332.5 Kg) [1063 lbs. (482.1 Kg) formed minus 330 lbs. (149.7 Kg) reacted]. Hydrogen combining with oxygen in weight proportions of 1:8 would require 5864 lbs. (2659.9 Kg) of oxygen for complete combustion of the surplus hydrogen and yield an additional 38.0 × 10$^6$ BTU (40.0 × 10$^9$ J). Since the heat of reaction is already twice the amount required for reduction of the oxides in the slag, however, it is not necessary to supply the additional oxygen and thereby produce additional energy. Furthermore, oxygen flow controls the overall heat balance and, as pointed out above, it is necessary to limit the oxygen supply to assure formation of sufficient CO.

The process of the present invention is preferably practiced by use of a top-entering submersible lance arranged to conduct oxygen in a central tube and fuel gas in an outer concentric tube. Preferably, multiple orifices are horizontally positioned near the lance tip to introduce the oxygen and fuel gas to the bath at the depth and in the dispersal pattern deemed most effective for proper mixing. In operation, the lance tip would be spaced from the refractory bottom of the treatment vessel a distance equal to about one-sixth of the height of the quiescent bath; with a bath height of 6 feet (1.83 m) as described above, the lance tip would be about 12 inches (0.305 m) from the refractory bottom. It will be apparent to those skilled in the art that submerged double pipe tuyeres of the type described in U.S. Pat. No. 3,706,549 incorporated herein by reference, may also be used in the present invention. Such tuyeres may be located in the vessel bottom or sides, or a combination thereof, as desired.

The particular injection apparatus selected for use in the present invention must take into account two distinct objectives: (i) to transfer to the slag sufficient heat from the combination of a portion of the entering fuel gas in order to supply the necessary energy for the endothermic reduction of the oxides in the slag; and (ii) to maximize contact between the oxides and the reducing gases formed by cracking of the other portion of entering fuel gas. With regard to this second objective, it is known that the smaller the gas bubble size, the slower the rate of rise of the bubbles in the bath and thus the greater the exposure of bubbles to the oxides. However, this consideration (minimum bubble size) must be balanced against the requirement for injecting relatively large volumes of gas into the slag bath.

In the practice of the present invention, fuel gas and oxygen issue from multiple orifices in the lance tip at sonic velocities to produce turbulence and obtain good mixing in the bath. Bath turbulence helps to prevent undesirable channeling of the upwardly rising gases. Off-gas flow rates approximating 150 SCFM per square ft. (0.71 m$^3$/s square meter) of surface area in the treatment vessel may be achieved in the process of the invention without the creation of excessive projections or splashing. In Example I above, this off-gas rate corresponds to about 12,800 (5.61 Nm$^3$/s) of waste gas for oxygen and fuel gas injection rates of 6400 SCFM (2.81 Nm$^3$/s) each.

As the capacity of the slag treatment vessel is increased, faster gas injection rates and shorter treatment times are obtained. For example, if the process of the invention were performed in the BOF itself for a 190 ton (172,365 Kg) heat rather than in a hot metal ladle corresponding to that heat size, gas injection rates could be doubled and the treatment time reduced by one half. Heat losses in this case would be correspondingly reduced. It can thus be seen that the ideal vessel for carrying out the process of the invention is the steelmaking furnace itself, after the tapping operation is completed; this is particularly true when the steelmaking furnace is a top-blown or a bottom-blown oxygen steelmaking vessel.

Exemplary of the gas injection equipment needed for delivering 6400 (2.81 Nm$^3$/s) each of fuel gas and oxygen is a 2.5 inch (6.35 cm) diameter standard weight pipe (for oxygen) concentrically positioned within a 5 inch (12.70 cm) diameter standard weight gas pipe. Pipeline pressures of about 90 psig (6.2 × 10$^5$ pascals) for the oxygen and 50 psig (3.45 × 10$^5$ pascals) for the fuel gas are appropriate for producing sonic velocities from the lance tip orifices.

The oxygen flow rate preferably is controlled manually at the start of the slag treatment process by observing the intensity of the flame above the treatment vessel. As the flame appears, oxygen flow volume is increased until it equals the fuel gas volume flow rate. These equal rates are then maintained throughout the process; however, oxygen flow rate adjustment may be necessary according to the judgment of the operator depending upon his observations of the bath surface and flame conditions. When the predetermined volumes of oxygen and fuel gas have been delivered to the bath, the treatment process is terminated. Again, adjustments in the termination point may be made according to the judgment of the operator depending upon such factors as bath fluidity and appearance, flame conditions, etc.

With complete reversion of iron, manganese, phosphorus and silicon, the initial one ton metal heel increases to a total weight of about 17,300 lbs. (7847 Kg) and has a composition of about 65% Fe, 23% Si and 6% each of manganese and phosphorus. The initial 58,000 lbs. (26,308 Kg) of slag diminishes in quantity due to the reduction of oxides to about 33,700 lbs. (15,286 Kg) and consists essentially of semi-molten lime at temperatures in excess of 2900° F (1593° C). Slag conditioning agents such as borates may be added during the process of the invention to aid in maintaining fluidity of the bath. At the end of the slag treatment process, the metal phase in the treatment vessel increases to about 6 inches (15.24 cm), and the slag depth diminishes to about 3½ feet (1.07 m). A characteristic of the process is that the vessel freeboard increases as the process proceeds; thus, any tendency towards splashing may be offset by injecting the gases at lower rates in the first stages and gradually increasing the flow rates later in the treatment cycle.

The sensible heat in the treated slag provides an important source of energy for the steelmaking heat in which the treated slag is used; further, the amount of slag formiing materials required for that heat may be reduced. The contaminated metal ingot formed as a by-product of the invention has scrap salvage value and can be remelted as part of an electric furnace charge.

What is claimed is:

1. A method of treating molten steelmaking slag comprising:
   i. isolating molten steelmaking slag from a steel heat;
   ii. simultaneously introducing sufficient oxygen and a fluid hydrocarbon fuel into the molten slag to reduce the oxides of iron, manganese, phosphorus and silicon to their elemental state to form a contaminated liquid steel; and,
   iii. recovering the contaminated steel so produced.

2. The method of claim 1 wherein there is molten steel present with the molten slag during treatment.

3. The method of claim 2 wherein the temperature of the molten slag is maintained at approximately the same temperature as in the production of the steel heat.

4. The method of claim 3 wherein said fluid hydrocarbon fuel is methane.

5. The method of claim 4 wherein said methane is in the form of natural gas.

6. The method of claim 5 wherein a heel of molten steel is present with said molten slag.

7. The method of claim 6 wherein the slag to steel weight ratio is greater than 20 to 1 weight.

8. The method of claim 7 wherein said fluid hydrocarbon and said oxygen are introduced into the molten slag by a submerged fuel/oxygen lance.

9. The method of claim 7 wherein said fluid hydrocarbon and said oxygen are introduced into the molten slag by submerged fuel/oxygen tuyeres.

10. The method of claim 7 wherein the oxygen to methane ratio is 2 to 2.

11. The method of claim 10 wherein said isolating step is accomplished by withdrawing the steel from the heat.

12. The method of claim 10 wherein the slag is treated in the steelmaking furnace.

13. The method of claim 10 wherein the slag is transferred from the steelmaking furnace to a treating vessel.

14. The method of claim 1 wherein the treated molten slag is used in a steelmaking heat.

15. The method of claim 1 wherein said oxygen and fluid hydrocarbon fuel are introduced into said slag at sonic velocities or below.

* * * * *